Figure 19:
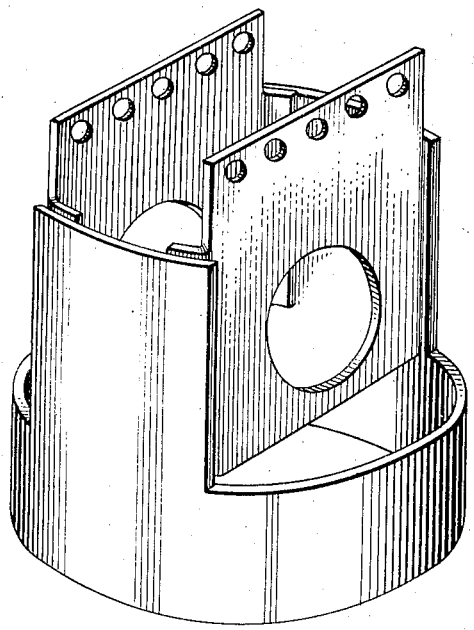

June 2, 1936.  A. L. NELSON  2,043,112
PISTON
Original Filed May 27, 1925    3 Sheets-Sheet 1
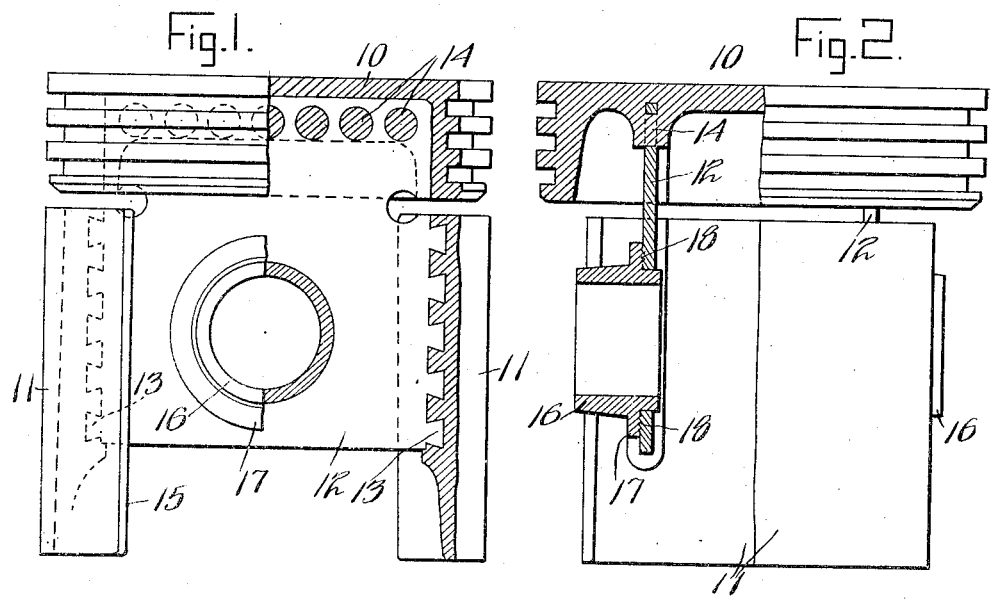
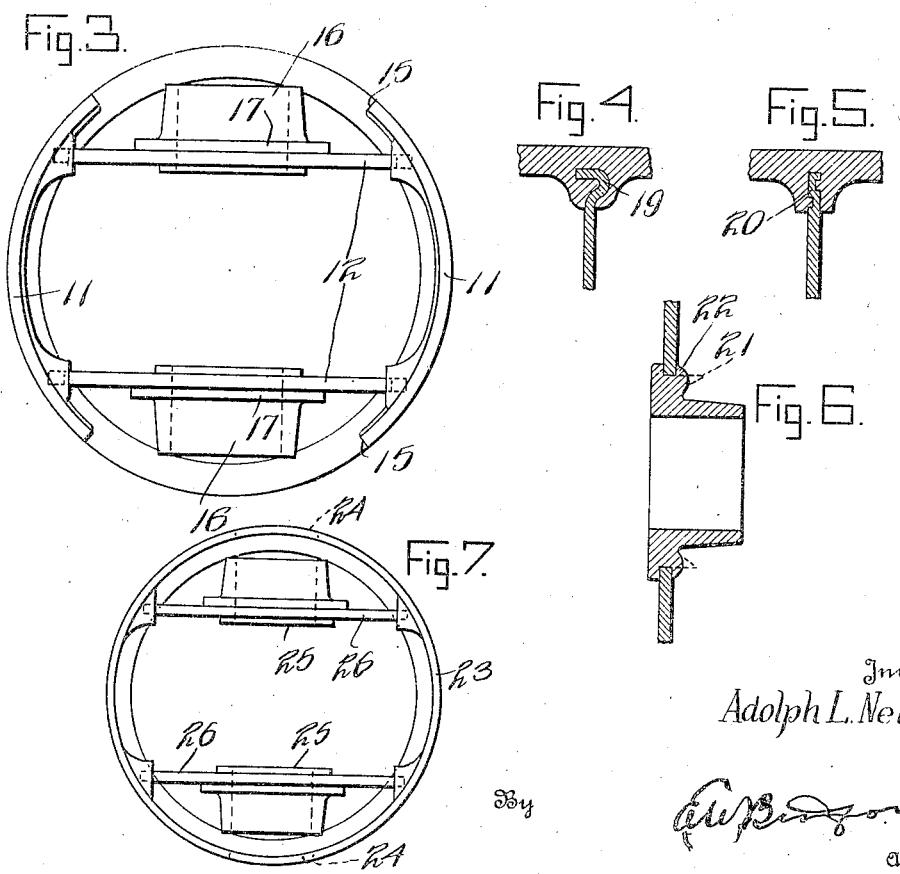
Inventor
Adolph L. Nelson
By
Attorney June 2, 1936. A. L. NELSON 2,043,112
PISTON
Original Filed May 27, 1925 3 Sheets-Sheet 2
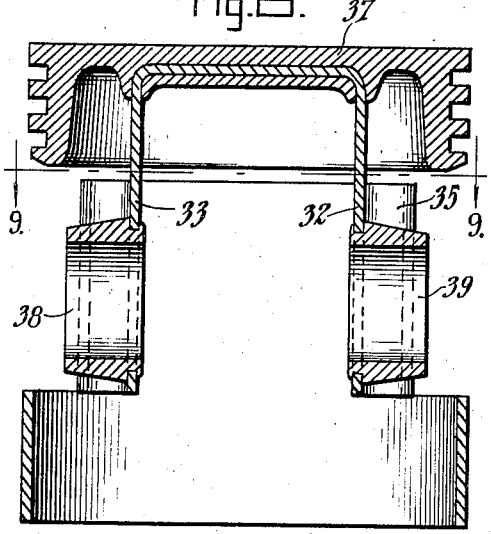
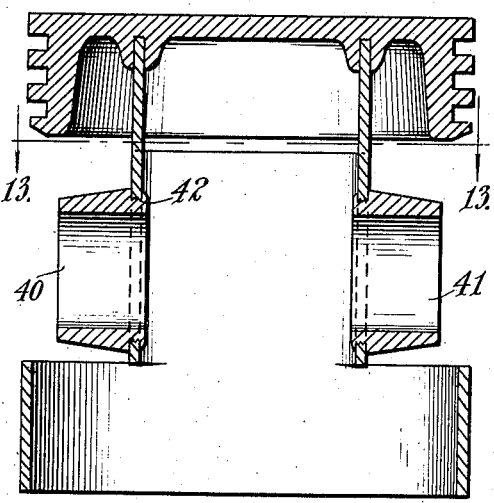
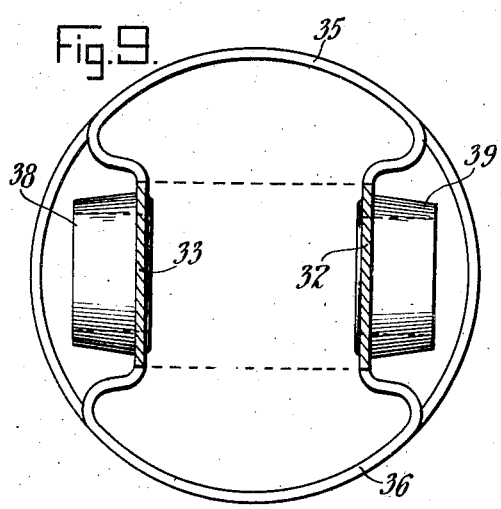
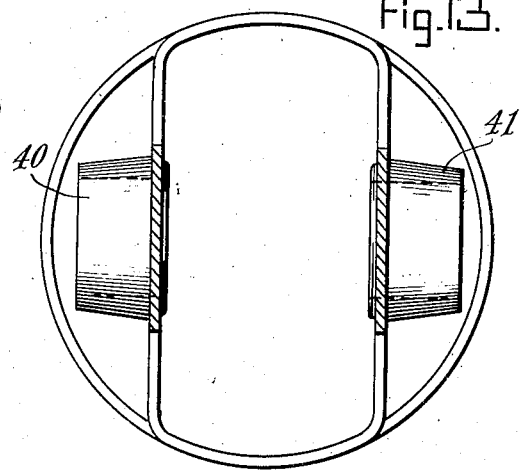
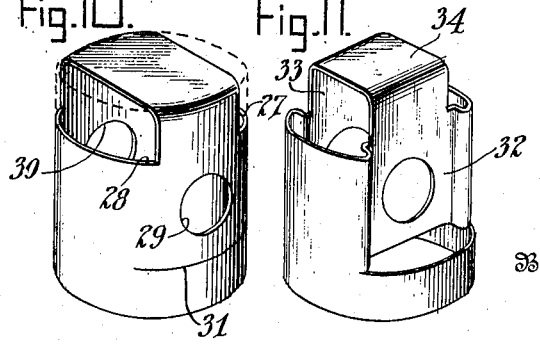
Inventor
Adolph L. Nelson
By
Attorney Patented June 2, 1936

2,043,112

UNITED STATES PATENT OFFICE 2,043,112

PISTON

Adolph L. Nelson, Detroit, Mich., assignor to Bohn Aluminum & Brass Corporation, Detroit, Mich.

Application May 27, 1925, Serial No. 33,216
Renewed May 14, 1931

12 Claims. (Cl. 309—13)

My said invention relates to a piston and it is an object thereof to provide a piston having a head of suitable material for high heat conductivity and minimum weight and a sectional skirt of suitable material for bearing qualities, such parts being united to each other by struts. The struts are designed to control the diametrical expansion of pistons hence they must be made of a material suitable for the expansion desired.

Another object is to provide a piston having independent skirt sections or aprons connected by struts which struts support piston pin bosses in spaced relation to said aprons. For some skirt materials it is desirable to join the aprons making the skirt in one piece.

Another object of the invention is to provide an improved method of making pistons, particularly when the piston head and the skirt are to be made of the same material.

Figure 15:
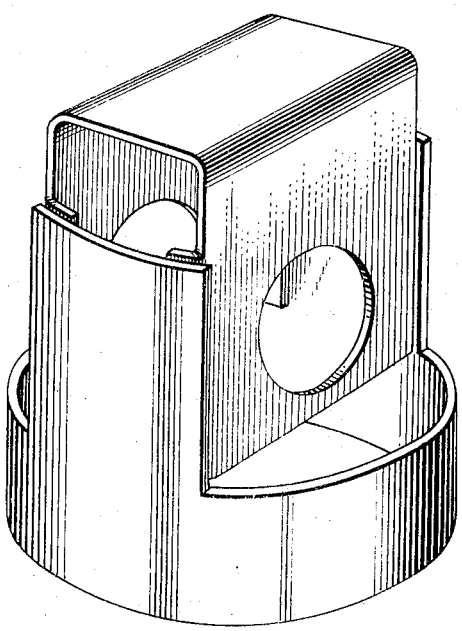
Figure 16:
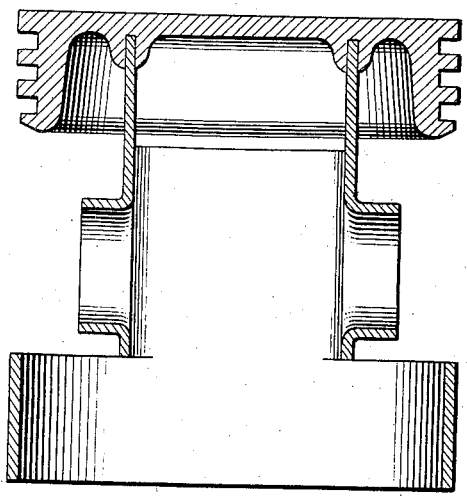
Figure 17:
Figure 18:

Referring to the accompanying drawings, which are made a part hereof and on which similar reference characters indicate similar parts, Figure 1 is a side elevation of my piston partly in vertical section, Figure 2, an elevation at right angles to Figure 1, also partly in section,

Figure 3, a plan,

Figures 4 and 5, details illustrating modifications of the means for attaching the struts to the piston head, Figure 6, a modification of the means for attaching the piston pin boss to a strut, Figure 7, a plan of a modification, Fig. 8 is a longitudinal section through another modification, Fig. 9 is a cross-section on line 9—9 of Fig. 8, Fig. 10 is a perspective showing a preliminary step in forming the piston of Fig. 10, Fig. 11 is a view similar to Fig. 10 but taken after a further forming operation, Fig. 12 is a longitudinal section through a further modification, Fig. 13 is a section on line 12—12 of Fig. 13, Fig. 14 is a perspective of a modified form of skirt, Fig. 15 is a perspective of another form of skirt, Fig. 16 is a longitudinal section of a piston incorporating additional features of skirt construction, Figs. 17 and 18 are views corresponding to Fig. 6, but showing modifications.

In the drawings reference character 10 indicates the head of a piston, the same being preferably formed from an aluminum alloy or other suitable material of high heat conductivity. The skirt has a pair of aprons or arcuate skirt sections 11 which are located at opposite sides of the line of the piston pin and are spaced from each other, these skirt sections being distinct and separate from the head and from each other except in so far as they are united to the head by a pair of struts 12 which are secured to the skirt sections by means of dove-tailed edge portions 13 buried in the skirt sections and to the head by apertures through which pass necks 14 of the material of the head. It is also obvious that the two skirt aprons may be made in one piece as in Fig. 14 or even be made integral with the struts as shown in Figs. 8 to 12 depending on the materials and the fits required in the cylinder. In some instances the two struts may be made in one piece as in Fig. 15 or otherwise united, the drawings showing the forms at present preferred by me. The struts generally are made of relatively inexpansible material to prevent radial expansion of the skirt.

The bosses 16 for the piston pin bearings are secured to the struts midway between the corresponding edges 15 of the skirt sections, the struts being provided with openings to receive the piston pin bosses which as shown in Figure 2 may have flanges 17 adapted to bear against one side of the adjacent strut. The flanges 17 are united to their corresponding struts by electric welding as indicated in Figure 2 at 18 or they may be united in any other suitable or convenient manner and in some instances they may even be made integral with the struts as in Fig. 16. The piston pin bosses require a hard material which will withstand strain in case the piston pin is held fast in the bosses; when the piston pin oscillates in the bosses a material is required such as has good wearing qualities.

Figures 4 and 5 illustrate at 19 and 20 other forms which the edges of the strut may take for attachment to the head or even in some cases to the skirt sections and Figure 6 illustrates a modified method of securing the piston pin bosses in place. In this case the piston pin bosses are formed with an annular axially projecting flange 21 and the bearing is inserted from the center toward the circumference of the piston after which the flange 21 is rolled down as illustrated at 22. It will be understood that other methods of attaching the piston pin bosses may be substituted as by die casting them in place after the main casting is made or by providing screw threads on the bosses and the struts or even by securing them in place by means of bolts and nuts as in Fig. 17.

In the operation of forming the piston by die casting a very considerable saving in die expense and time required to operate the die when the piston head and skirt are of the same material may be had since the center core can be made in one piece in place of the conventional three, five or seven piece core required to be made and operated for die casting conventional pistons of aluminum or its alloys. It will be evident that the struts 12 can be positioned in a die core having parallel transverse slots for receiving the struts after which the skirt sections and the head may be cast thereon and then the core withdrawn by movement lengthwise of the piston axis. After the casting operation the piston pin bearings may be attached by the method above referred to or by any other desirable method. It will be understood that the struts need not be flat pieces of metal but may be arcuate or of other suitable shapes to suit the piston design required or to suit the moulding process.

Various methods of making the piston can be used; for instance, the piston head can be cast about the struts and then a steel shell can be slipped over the ends of the struts and welded thereto thus forming a piston skirt of the type illustrated in Figs. 14 and 15.

Figure 7 shows a piston with a skirt 23 made in one piece and interrupted only by a pair of holes at 24, 24 through which the piston pin is passed into the bosses 25 which are carried by struts 26 secured to the skirt in any suitable manner, as for example by casting the skirt about the struts which are held in a suitable mold. If preferred the struts may be in one piece with the skirt.

In the piston disclosed in Figs. 8 to 11 the skirt and struts are formed from a single piece of material such as sheet metal. These parts are formed from a cup-shaped member indicated in dotted lines in Fig. 10 by cutting out opposite corners as at 27 and 28, piercing boss apertures 29 and 30, and cutting slits 31 below the boss apertures. The blank is then subjected to a forming operation which bends in the parts carrying the boss apertures to form the struts 32 and 33 connected together by an integral top piece 34 and inset from the edges of the cylinder bearing portions 35 and 36. The head 37, which may be of a light alloy or other material, is then cast about the top piece 34, in such a fashion that it is held spaced from the cylinder bearing portions of the skirt, and the pin bosses 38 and 39 are secured in the boss apertures in any suitable manner, as by die casting.

The piston of Fig. 12 is similar to that of Fig. 8 except that the struts are not inset from the edges of the bearing portions and are not connected by an integral top piece, but have their ends embedded in the head after the manner of Fig. 1. In this case the pin bosses 40 and 41 are screw threaded into place and locked by upsetting at 42.

It will be obvious to those skilled in the art that various changes may be made in my device without departing from the spirit of the invention and therefore I do not limit myself to what is shown in the drawings and described in the specification but only as indicated in the appended claims. This application is a continuation in part of my application No. 643,499, filed June 5, 1923.

Having thus fully described my said invention, what I claim as new and desire to secure by Letters Patent, is:

1. A piston comprising a pair of struts, a head having interlocking engagement with said struts, a skirt also having interlocking engagement with said struts, and piston pin bosses on the struts, the pin bosses being separate from the head and skirt except for the connection through the struts.

2. A piston comprising a head and a skirt, the skirt having cylinder-bearing portions on its opposite sides, a pair of relatively inexpansible struts extending transversely of the skirt and connected to the cylinder bearing portions and the head, the head and cylinder-bearing portions being formed of light weight cast metal having a higher rate of thermal expansion than the material of the struts, and pin bosses secured to the struts, the pin bosses being separate from the head except for the connection through the struts.

3. A piston comprising a head formed of light weight cast metal and having a lower edge, a skirt having cylinder-bearing portions formed of light weight material, a pair of relatively inexpansible struts extending transversely of the skirt and connected to the cylinder-bearing portions, the upper edges of the struts extending above the lower edge of the head, the head being connected to the struts solely by cast-in joints located above the lower edge of said head.

4. A piston comprising a head formed of light-weight cast material and a skirt formed of sheet steel and including a lower annular part and cylinder-bearing portions extending upwardly from opposite sides of the annular part, a pair of struts of relatively inexpansible material extending chordally across the skirt, each strut being attached to both cylinder-bearing portions, and piston pin bosses supported solely by the struts.

5. A piston comprising a head formed of light-weight cast material and a skirt formed of sheet steel and including a lower annular part and cylinder-bearing portions extending upwardly from opposite sides of the annular part, a pair of struts of relatively inexpansible material extending chordally across the skirt, the struts being attached to the cylinder-bearing portions although originally having been separate therefrom, and piston pin bosses supported solely by the struts.

6. A piston comprising a unitary, homogeneous piece of sheet metal forming a pair of chordal struts and a plate connecting the upper ends of the struts, a head of light-weight material attached to the plate, the piston skirt having a lower annular part and cylinder-bearing portions extending upwardly from the annular part, the cylinder-bearing portions being attached to the struts.

7. A piston comprising a unitary, homogeneous piece of sheet steel forming a pair of chordal struts and a plate connecting the upper ends of the struts, a head of light-weight material attached to the plate, a piston skirt of sheet steel comprising a lower annular part and cylinder-bearing portions extending upwardly from the annular part, the cylinder-bearing portions being attached to the struts.

8. A piston comprising a unitary, homogeneous piece of sheet steel forming a pair of chordal struts and a plate connecting the upper ends of the struts, a head of light-weight material attached to the plate, a piston skirt of sheet steel comprising a second unitary, homogeneous piece of sheet steel formed into a lower annular part and cylinder-bearing portions extending upwardly from the annular part, the cylinder-bearing portions being attached to the struts.

9. A piston comprising a unitary, homogeneous piece of sheet metal formed into a lower annular part with cylinder-bearing portions extending upwardly from the annular portion and chordal struts connecting the cylinder-bearing portions, a head of light-weight material secured to the struts, and piston pin bosses supported solely by the struts.

10. A piston comprising a unitary, homogeneous piece of sheet metal formed into a lower annular part with cylinder-bearing portions extending upwardly from the annular portion and chordal struts connecting the cylinder-bearing portions, and a top plate connecting the upper edges of the struts, a head of light-weight material secured to the top plate, and piston pin bosses supported solely by the struts.

11. A piston comprising a pair of chordal plates acting as struts for the piston, a head having an interlocking joint with the upper end of each plate, and a skirt having an interlocking joint with the opposite vertical edges of each plate.

12. A piston comprising a skirt, a pair of chordal plates acting as struts for the piston and engaging the skirt, and a head having an interlocking joint with the upper end of each plate.

ADOLPH L. NELSON.